United States Patent [19]

Ohta et al.

[11] 4,398,793

[45] Aug. 16, 1983

[54] FIBER OPTIC CABLE CONNECTOR

[75] Inventors: Yukitake Ohta; Yasuo Fukunaga; Hitoshi Masubuchi, all of Mooka, Japan

[73] Assignee: Allied Corporation, Morris Township, Morris County, N.J.

[21] Appl. No.: 232,594

[22] Filed: Feb. 9, 1981

[30] Foreign Application Priority Data

Feb. 23, 1980 [JP] Japan .............................. 55-22534[U]

[51] Int. Cl.³ .................................................. G02B 7/26
[52] U.S. Cl. ............................. 350/96.20; 350/96.23
[58] Field of Search .............. 350/96.20, 96.21, 96.22, 350/96.23

[56] References Cited

U.S. PATENT DOCUMENTS

| 3,982,060 | 9/1976 | Avery et al. ............... | 350/96.20 X |
| 4,181,397 | 1/1980 | Baker et al. ............... | 350/96.20 |
| 4,252,405 | 2/1981 | Oldham ...................... | 350/96.22 |
| 4,264,129 | 4/1981 | Warkentine ................. | 350/96.22 |
| 4,279,466 | 7/1981 | Makuch et al. ............. | 350/96.21 |

FOREIGN PATENT DOCUMENTS 2545467 4/1977 Fed. Rep. of Germany ... 350/96.20

*Primary Examiner*—John D. Lee
*Assistant Examiner*—Frank González
*Attorney, Agent, or Firm*—Roger H. Criss; James P. DeClercq

[57] ABSTRACT

An optical fiber connector including an insertion member having first and second annular portions, the first portion having a larger outside dimension than the second portion. When the connector is inserted on the fiber optic cable, the first portion of the insertion member underlies the insulation and fiber sleeves of the cable whereas the second portion of the insertion member underlies not only the insulation and fiber sleeves but also the outer shell of the cable. A ferrule is employed to mechanically stabilize the cable about the first and second portions of the insertion member of the connector. The cable, including its outer shell, is firmly held in position. Preferably, the ferrule includes one or more openings therein to even more firmly hold the outer shell in position.

6 Claims, 4 Drawing Figures

FIBER OPTIC CABLE CONNECTOR

TECHNICAL FIELD

This invention relates to connectors for fiber optic cables and, more particularly, to the method and apparatus for fastening the fiber optic cable to a fiber optic connector.

BACKGROUND OF THE PRIOR ART

Optical communication links employing fiber optics are presently being used with increasing frequency in lieu of conventional electrically conductive lines. This is due to the superior bandwidth of optical links which permits them to carry many communication channels on any given optical link. The fiber optics employed in the optical communication links are transparent fibers which are usually made of glass or plastic. These transparent fibers tend to be relatively thin and fragile and thus are more difficult to work with than conventional electrical wires. Since connectors by their very nature are subject to manipulation by humans, the fiber optic cable must be adequately and properly coupled to the body of the connector so as to protect the transparent fiber therein from damage. Additionally, when optical fibers are coupled together, they must be maintained in both axial and angular alignment with each other to rather close tolerances if light losses in the point of connection are to be maintained within acceptable limits.

Connectors satisfying the aforementioned objectives would be considerably less difficult to construct if the aforementioned problems were encountered only by trained physicists, for example, working in a sophisticated laboratory environment. However, optical fibers are likely to form the basis of large scale communication networks in the future and accordingly they must be connected and disconnected relatively often by ordinary personnel working in the field, without the benefit of sophisticated laboratory equipment, and be subject to environmental conditions found in the field as opposed to those found in the laboratory.

The large number of such connectors which will be required dictates that the connectors employed should be relatively inexpensive, should stabilize the cable in a predetermined position in the connector, prevent shifting the position of the transparent fiber within the connector body and protect the transparent fiber from damage when the cable is twisted or pulled by field personnel.

A fiber optic cable is shown in cross section in FIG. 1 of the drawing. The cable includes an optic fiber 1, an insulating sleeve 2, which, for example, may be manufactured from nylon, a reinforcing fiber sleeve 3 which is employed to resist stretching the fiber optic cable when it is pulled and an outer shell 4, which, for example, may be made of vinyl, to protect the cable and resist undue twisting and bending thereof.

FIG. 2 is a partially cut away section view of a conventional prior art connector. The connector shown in FIG. 2 is a male connector. However, it will be apparent to those skilled in the art that the details with respect to the manner in which the fiber optic cable is attached to the connector would differ little for a female connector. The connector includes an annular body 5 having an annular insertion member 8 disposed at one end thereof. The insertion member includes a sharp edge 7 to facilitate the insertion of insertion member 8 into an exposed end of the fiber optic cable. Body 5 includes an opening 6 for receiving the optic fiber 1 of the cable and for communicating it with the optic fiber in the associated female connector (not shown). A coupling nut 10 is rotatably mounted on body 5 to facilitate the coupling of the male connector to the female connector.

As can be seen from FIG. 2, outer shell 4 of the fiber cable is partially removed from the end of the cable exposing a short length of reinforcing fiber sleeve 3. The insertion member generally urges the exposed portion of the fiber sleeve 3 and its underlying insulation sleeve 2 radially outwardly. To prevent a decrease in the holding ability of the connector as a result of the weaves of the reinforcing fiber sleeve 3 unwinding, the exposed fiber is preferably treated with, for example, epoxy resin. Subsequently, a fastening ferrule 9 made of a pliable metal is placed over the cable, positioned over the exposed portion of reinforcing fiber 3 as well as the adjacent end portion of outer shell 4 and then the ferrule is fastened mechanically with pressure to stabilize the cable.

This fiber optic cable connector in use suffers from the disadvantage that the outer shell 4 tends to withdraw from ferrule 9, as indicated by the outer shell 4' shown in dashed lines in FIG. 2, thereby exposing the internal construction of the cable to the environment. Moreover, since one of the functions of the outer shell is to protect the cable against twisting forces, this protection is lost at a highly critical point in the fiber optic system, namely directly adjacent to the connector itself which is subject to human manipulation. Thus, when the connector of FIG. 2 is used, the optic fiber may be subjected to damage. This is particularly true when less pliable glass fibers are used as the transparent fiber of the optical cable.

Several techniques have been proposed in the prior art to overcome the withdrawal of the outer shell 4 from ferrule 9. For example, it has been proposed to adhere outer shell 4 to ferrule 9 by using a glue, such as epoxy resin, between ferrule 9 and outer shell 4. Additionally, it has been proposed that the adherence between the outer shell 4 and the reinforcing fiber system 3 should be improved. These methods have been found to be not altogether practical. The vinyl outer shell 4 becomes soft with rising environmental temperature which decreases its adherence to the fiber sleeve 3. Using epoxy resin to adhere ferrule 9 to the outer shell 4 is not only a cumbersome operation but it has been found that it is very difficult to achieve sufficient adherence between these two members.

BRIEF SUMMARY OF THE INVENTION

The present optic fiber connector overcomes the difficulties associated with the prior art connector previously mentioned. The present fiber optic connector includes an insertion member having first and second annular portions, the first portion having a larger outside dimension than the second portion. When the connector is inserted on the fiber optic cable, the first portion of the insertion member underlies the insulation and fiber sleeves whereas the second portion of the insertion member underlies not only the insulation and fiber sleeves but also the outer shell of the cable. A ferrule is employed to mechanically stabilize the cable about the first and second portions of the insertion member of the connector. The cable, including its outer shell, is firmly held in position. Preferably, the ferrule includes one or more openings therein to even more firmly hold the outer shell in position.

DETAILED DESCRIPTION OF THE INVENTION

Figure 1:
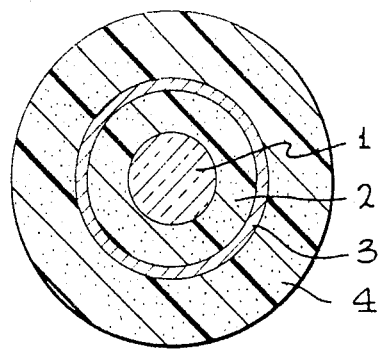
FIG. 1 is a cross section of a fiber optic cable.
Figure 2:
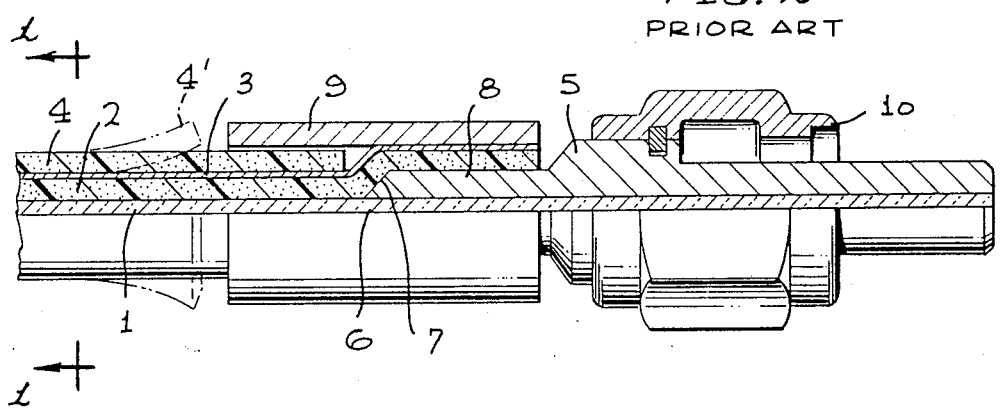
FIG. 2 depicts a partially cut away section view of a conventional fiber optic cable connector.
Figure 3:
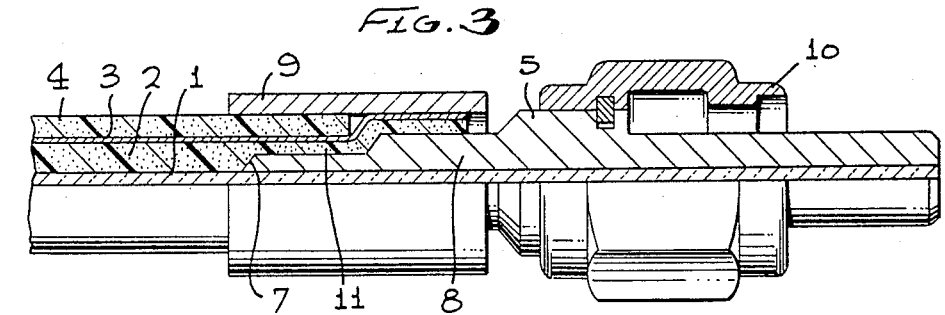
FIG. 3 is a partially cut away section view showing a fiber optic connector of the type employing the present invention.

Turning to FIG. 3, there is depicted a partially cut away section view of a fiber optic connector employing the present invention. The connector of FIG. 3 is also a male connector and a consistent numbering system is used to refer to the elements of the connector as was used with respect to FIGS. 1 and 2.

The connector of FIG. 3 includes an insertion member, the insertion member having a first portion 8 and a second portion 11. The insertion tip 7 is disposed at the distal end of the insertion member adjacent to second portion 11. The second portion 11 has a smaller outside diameter than the first portion 8. The insertion member 8, 11 is of an annular construction for receiving the optic fiber 1 of the cable.

The outer shell 4 of the cable is partially removed to expose a short length of the underlying fiber sleeve 3. The first portion 8 of the insertion member underlies the exposed portion of the fiber sleeve 3 when the connector is attached to the cable whereas the first portion 11 of the insertion member underlies insulation sleeve 2, fiber sleeve 3, and shell 4 of the cable immediately adjacent to the short length of cable where the fiber sleeve 3 is exposed. A ferrule 9 is employed to firmly hold the cable in position, the ferrule 9 being disposed radially outwardly from both the first portion 8 and second portion 11 of the insertion member and mechanically fastened in place. Of course, sandwiched between ferrule 9 and the first portion 8 of the insertion member are the short length of the previously exposed fiber sleeve 3 and its underlying sleeve of insulation 2 while sandwiched between the second portion 11 of the insertion member and ferrule 9 are the insulation sleeve 2, fiber sleeve 3 and outer shell 4 of the cable immediately to the rear of the short length of the previously exposed fiber sleeve. The difference in the radial thicknesses of the first portion 8 and second portion 11 of the insertion member is preferably essentially equal to the thickness of outer shell 4. The axial length of the short length of the exposed fiber sleeve 3 is preferably about the same as the axial length of the first portion 8 of the insertion member.

The resulting connector essentially has two fastening mechanisms, the first being the first portion 8 of the insertion member in combination with ferrule 9 and the second being the second portion 11 of the insertion member in combination with ferrule 9. The fastening power thereby created is superior to that of the conventional connector of FIG. 2.

Slippage of the outer shell 4 from ferrule 9 is prevented by means of the second fastening mechanism. The cumbersome and unsure process of gluing the outer shell 4 to the ferrule as mentioned above with respect to FIG. 2 is not required and accordingly preferably not utilized. The connector of FIG. 3 provides a stable and accurate connection of the optic fiber to the connector for transmission of optic signals and reduces the likelihood of damage to the optic fiber as a result of human manipulation of the connector.

Figure 4:
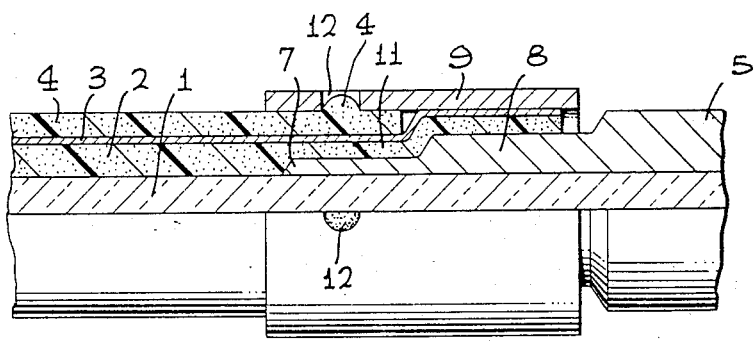
FIG. 4 is a partially cut away section view of a portion of a fiber optic connector showing an alternative embodiment of the present invention.

In order to fasten the outer shell even more securely to the connector, one or more grip openings 12 may be provided in the ferrule on that portion thereof radially outwardly from the second portion 11 of the insertion member, as is shown in FIG. 4. With the construction shown in FIG. 4, a portion of the outer shell 4 protrudes into the grip opening 12 when the pliable ferrule 9 is mechanically fastened with pressure to the cable and its connector. The employment of one or more grip openings 12 in ferrule 9 further reduces not only the possibility of withdrawl of the outer shell 4 from the ferrule but also the possibility of the outer shell 4 twisting or turning with respect to the connector.

Although the present invention has been described with reference to certain specific embodiments thereof, this description is not meant to be construed in a limiting sense. Various modifications of the disclosed embodiments as well as alternative embodiments of the invention will become apparent to those persons skilled in the art upon reference to this description of the invention. It will be apparent that the materials and construction of the fiber cable may be varied as a matter of design choice. The invention itself is not to be limited to the disclosed embodiments, except as is specifically set forth in the appended claims.

We claim:

1. A connector for a fiber optic cable having a core, an insulating layer and an outer shell, comprising:
    a connector body having an insertion member for inserting into an end of said fiber optic cable and around said core;
    said insertion member having first and second portions constructed for insertion into the end of the cable when the connector is fastened thereto;
    said connector further including a ferrule for fixing the cable to the connector, the ferrule being adapted to be disposed radially outwardly of both said first and said second portions of said insertion member;
    said ferrule gripping said insulating layer between said first portion and said ferrule and gripping said insulating layer and said outer shell between said second portion and said ferrule to retain said outer shell to said connector body.

2. A connector according to claim 1, wherein:
    said outer shell of said cable is partially removed away at said end of the cable and wherein the difference in the radial thickness between said first and second portions of said insertion member is substantially the same as the thickness of the outer shell of the cable.

3. A connector according to claim 2, wherein:
    the axial length of the portion of the cable from which the outer shell alone is removed is approximately equal to the axial length of the first portion of the insertion member.

4. A connector according to claim 3, wherein:
    said ferrule has at least one opening therein for receiving and gripping a portion of the outer shell of the cable.

5. A connector according to claim 4, wherein:

said at least one opening is disposed in said ferrule such that when said ferrule is disposed radially outwardly of the insertion member, the opening is radially outwardly of the second portion of the insertion member.

6. A connector according to claim 1, wherein:
said second portion includes a sharp insertion tip to aid the insertion of said insertion member into the cable.

* * * * *